United States Patent [19]

Yarrow

[11] 4,191,902

[45] Mar. 4, 1980

[54] ROTARY ELECTRIC MACHINES

[75] Inventor: Christopher J. Yarrow, Bradford, England

[73] Assignee: Lucas Industries Limited, Birmingham, England

[21] Appl. No.: 859,128

[22] Filed: Dec. 9, 1977

[30] Foreign Application Priority Data

Dec. 11, 1976 [GB] United Kingdom ............... 51816/76

[51] Int. Cl.² ............................................ H02K 11/00
[52] U.S. Cl. ..................................... 310/68 D; 310/71
[58] Field of Search .................... 310/68 D, 68 R, 71; 339/5 R

[56] References Cited

U.S. PATENT DOCUMENTS

| 3,335,348 | 8/1967 | Gossel | 310/68 X |
|---|---|---|---|
| 3,509,447 | 4/1970 | Wharton | 310/68 X |
| 3,723,794 | 3/1973 | Spisak et al. | 310/68 D |
| 3,902,774 | 9/1975 | Gronholm | 310/68 X |

Primary Examiner—Donovan F. Duggan

[57] ABSTRACT

In a rotary electric machine having a winding and a rectifier arrangement which rotate in unison, the rectifier comprises a plurality of diodes each having a terminal lug extending parallel to the rotor axis, and electrical connections between the winding and rectifier arrangement are provided by connectors which extend between the respective terminal lugs and locations on the winding which are generally diametrally opposite the lugs, whereby the combination of the centrifugal forces on each lug and connector prevents distortion of the lugs.

6 Claims, 3 Drawing Figures

ROTARY ELECTRIC MACHINES

This invention relates to rotary electric machines.

It is known to provide electric generators having first and second alternators driven by a single shaft, the alternating output of a first one of the alternators being rectified by rectifiers which rotate with the shaft, and the rectifier current then being used to provide a supply to a rotating winding of the second alternator. For reasons of space the rectifiers are stud-mounted diodes with the axes of the mounting studs and terminal lugs parallel to the axis of the drive shaft.

It has been proposed, in particular for generators to be carried on aircraft, to provide a two-pole rotor, and to rotate the generator at 24,000 rpm, the frequency of the resultant output being 400 Hz. It has been found that at these speeds centrifugal forces acting on the diodes can cause damage thereto, particularly by distorting the terminal lugs.

It is an object of the present invention to provide a rotary electric machine of the foregoing type in which damage to the diodes from this cause may be reduced.

According to the invention a rotary electric machine includes a shaft, a winding mounted for rotation with said shaft, a stud-mounted diode carried by said shaft for rotation therewith, a terminal lug of the diode extending substantially parallel to the shaft axis, and an electric connector between said lug and a location on said winding generally diametrally opposite said lug, the arrangement being such that, in use, the sum of the centrifugal forces acting on said lug and on a portion of said connector adjacent thereto on one side of the shaft axis is substantially equal in magnitude and opposite in direction to the centrifugal force acting on the portion of said connector on the other side of the shaft axis. In a preferred embodiment there is provided a plurality of said diodes and a plurality of said connectors between the lugs on respective ones of said diodes and generally diametrally opposite portions of said winding.

Embodiments of the invention will now be described by way of example only and with reference to the accompanying drawings in which.

Figure 1:
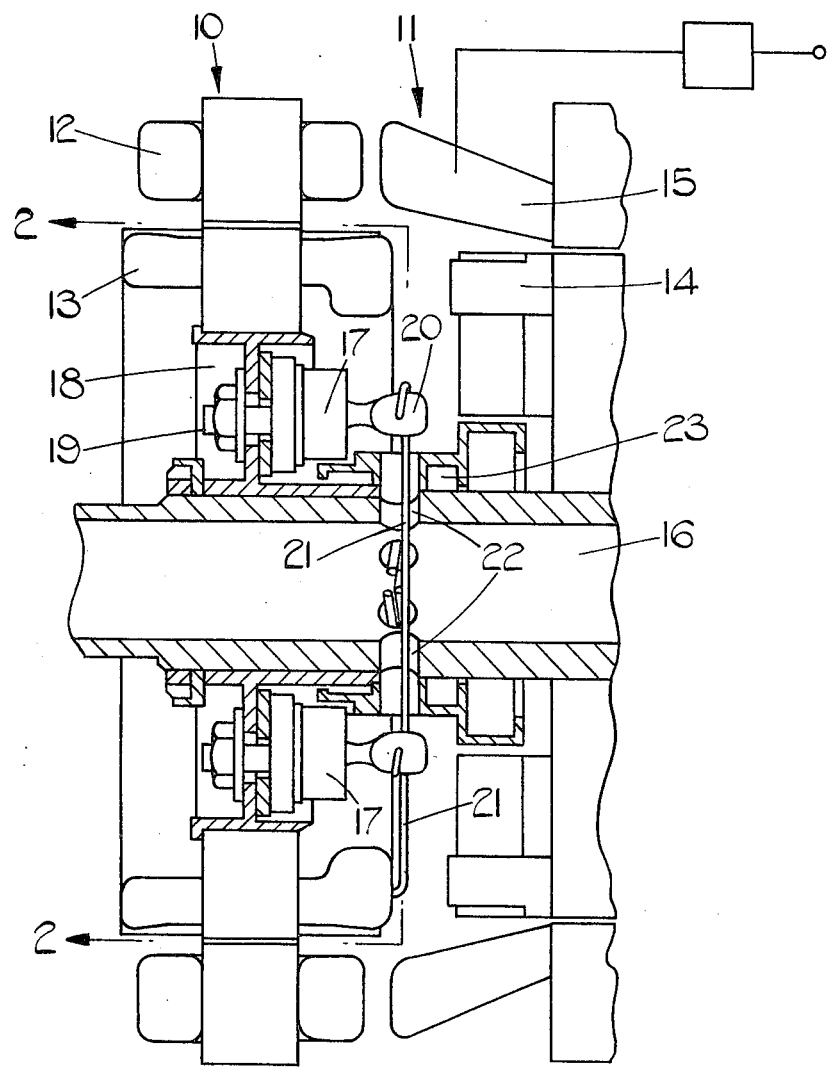
FIG. 1, is a section through part of a brushless electric generator.
Figure 2:
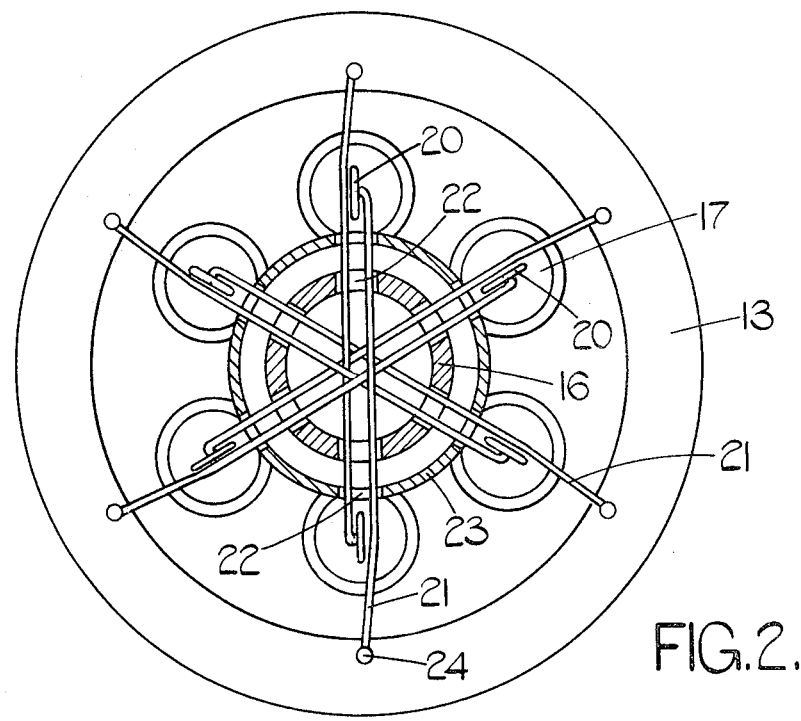
FIG. 2, is a section on line 2—2 in FIG. 1.

The generator of FIG. 1, is of a known type having first and second alternators 10, 11. The alternator 10 has a stationary field winding 12 and a rotor winding 13. The alternator 11 has a rotor winding 14 and a stationary winding 15. The windings 13, 14 are carried on a common shaft 16, of the generator. The alternator 10 is arranged so that when the winding 12 is separately excited and the shaft 16 is driven, the output of the alternator 10 is a three-phase current. The output of the alternator 10 is supplied to the alternator 11 via a rectifier arrangement comprising six power-rectifying diodes 17 mounted on a flange 18 forming part of the shaft 16.

The diodes 17 are stud-mounted so that the axes of the studs 19 and of the terminal lugs 20 of the diodes extend parallel to the axis of the shaft 16. The respective lugs 20 are electrically connected to the winding 13 by insulated wires 21. Each of the wires 21 extends through apertures 22, in the shaft 16 and a surrounding collar 23, so that each of the lugs 20 is connected to the winding 13 at a terminal point 24 thereon diametrically opposite that lug 20.

The diameters of the wires 21 and the radial distances of the points 24 from the axis of the shaft 16, and hence the lengths of the wires 21, are selected so that the sum of the centrifugal forces acting on each lug 20 and the portion of the wire 21 adjacent that lug 20 on one side of the axis of the shaft 16 is balanced by the centrifugal force acting on the portion of the wire 21 on the other side of the axis of the shaft 16. Tendency of the lugs 20 to bend radially outwards under the effect of centrifugal forces is thus resisted by the tension in the wires 21, but this tension is not applied to the terminal points 24.

Figure 3:
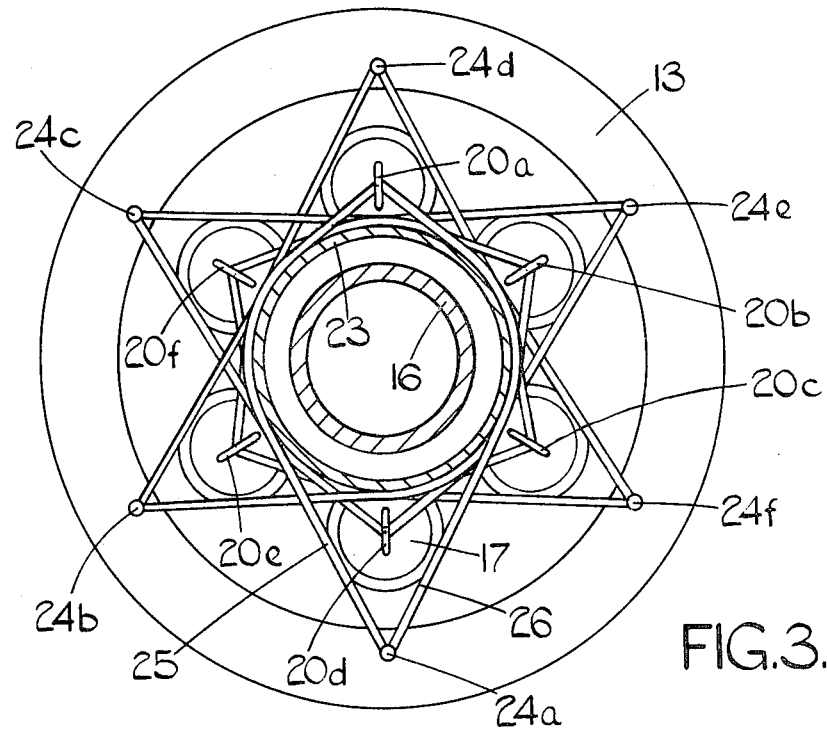
FIG. 3, is a view, corresponding to FIG. 2, and showing an alternative connector arrangement.

In the alternative embodiment shown in FIG. 3 a lug 20a is connected to a diametrically opposite terminal point 24a by identical insulated wires 25, 26 which pass around opposite sides of the collar 23, instead of passing through the shaft 16. The lengths and diameters of the wires 25, 26 are selected as above described, so that the sum of the centrifugal forces acting on the lug 20a and the portions of the wires 25, 26 adjacent thereto are equal and opposite to the centrifugal forces acting on the portions of the wires 25, 26 adjacent the terminal point 24a. The provision of two wires 25, 26 has the effect that a centrifugal force on the wire 25, acting to urge the lug 20a to the left, as seen in the drawing, is opposed by a centrifugal force on the wire 26 acting to urge the lug 20a to the right.

The lugs 20b, 20c, 20d, 20e, and 20f are similarly connected to diametrically opposite terminal points 24b, 24c, 24d, 24e, and 24f.

I claim:

1. A rotary electric machine including a shaft, a winding mounted for rotation with said shaft, a stud-mounted diode carried by said shaft for rotation therewith radially inwardly of said winding, a terminal lug of the diode extending substantially parallel to the shaft axis, and an electric connector between said lug and a location on said winding generally diametrically opposite said lug, the arrangement being such that, in use, the centrifugal forces acting on said lug and on a first portion of said connector adjacent thereto on one side of the shaft axis is opposed by the centrifugal force acting on a second portion of said connector on the other side of the shaft axis.

2. A machine as claimed in claim 1 in which said pair of connectors extend round said shaft on opposite sides thereof.

3. A machine as claimed in claim 1 which includes a plurality of said diodes and a plurality of connectors between the lugs on respective ones of said diodes and generally diametrally opposite portions of said winding.

4. A machine as claimed in claim 3 which includes a plurality of said diodes and plurality of pairs of connectors between the lugs on respective ones of said diodes and generally diametrically opposite portions of said winding.

5. A machine as claimed in claim 1 in which said connector extends around the periphery of said shaft between said lug and said winding location.

6. A machine as claimed in claim 1 in which the arrangement is such that said sum of the centrifugal forces on said lug and said first connector portion is substantially equal in magnitude and opposite in direction to the centrifugal force acting on said second connector portion.

* * * * *